United States Patent [19]

Marron

[11] Patent Number: 5,359,730
[45] Date of Patent: Oct. 25, 1994

[54] METHOD OF OPERATING A DATA PROCESSING SYSTEM HAVING A DYNAMIC SOFTWARE UPDATE FACILITY

[75] Inventor: Assaf Marron, Poughkeepsie, N.Y.

[73] Assignee: International Business Machines Corporation, Armonk, N.Y.

[21] Appl. No.: 985,762

[22] Filed: Dec. 4, 1992

[51] Int. Cl.⁵ .................................. G06F 9/06
[52] U.S. Cl. ........................ 395/650; 364/DIG. 1; 364/280; 364/286
[58] Field of Search ............ 364/DIG. 1 MS File; 395/650, 700

[56] References Cited

U.S. PATENT DOCUMENTS

| | | | |
|---|---|---|---|
| 4,604,690 | 8/1986 | Crabtree et al. | 364/DIG. 1 |
| 4,607,332 | 8/1986 | Goldberg | 364/DIG. 2 |
| 4,809,170 | 2/1989 | Leblang et al. | 364/DIG. 1 |
| 4,862,349 | 8/1989 | Foreman et al. | 364/DIG. 1 |
| 4,953,079 | 8/1990 | Ward et al. | 364/DIG. 1 |
| 4,954,941 | 9/1990 | Redman | 364/DIG. 1 |
| 4,980,822 | 12/1990 | Brantley et al. | 364/DIG. 1 |
| 5,210,854 | 5/1993 | Beaverton et al. | 364/DIG. 1 |

OTHER PUBLICATIONS

G. Etzkorn, "Change Programming In Distributed System", Intnl. Workshop on Configurable and Distributed Systems, pp. 140-151, London UK, Mar. 25-27, 1992.
O. Frieder et al., "Dynamic Program Modification In Telecommunication Systems", Proceedings of the IEEE Seventh Conf. on Software Engrg. for Telecommunication Switching Systems, pp. 168, 172, 1989.

*Primary Examiner*—Thomas M. Heckler
*Attorney, Agent, or Firm*—William B. Porter; Douglas R. McKechnie

[57] ABSTRACT

A dynamic software update facility (DSUF) is installed in a data processing system for the purpose of non-disruptively replacing old operating system programs or modules with new updated versions thereof while providing continuous availability and operation of the system. The new versions are loaded into the system along with change instructions providing information controlling the update. Task or process control blocks contain markers indicating the corresponding tasks are safe or unsafe to run the new programs. The markers are set initially to unsafe. A change descriptor table is stored and contains control information derived from the change instructions. When the DSUF is activated, an interrupt handler is installed and traps are stored in the old programs at entry points and safety points therein. Entry point traps are tripped when a task or process enters the old program and interrupts are generated that are handled by the interrupt handler to route tasks which are unsafe to the old program and tasks which are safe to a new program. When all tasks are safe, the new programs replace the old programs. When safety point traps are tripped, a task or process may change its state from unsafe to safe when predetermined conditions are met.

19 Claims, 4 Drawing Sheets

METHOD OF OPERATING A DATA PROCESSING SYSTEM HAVING A DYNAMIC SOFTWARE UPDATE FACILITY

BACKGROUND OF THE INVENTION

This invention relates to the field of data processing, and, more particularly, to improvements in a method for dynamically making software changes in a running system.

There are commercially available data processing systems such as IBM ESA/390 data processing systems, which operate with many resident programs or modules such as those of the commercially available IBM MVS/ESA operating system. ("IBM", "ESA/390", and "MVS/ESA" are trademarks of International Business Machines Corporation) When a system is running, such resident modules are accessible to each other in many different ways, and multiple tasks and processes can independently access the programs. From time to time, various operating system modules are updated and it becomes necessary to substitute new versions for the old versions. The problem thus exists of how to effect non-disruptive replacement while the system is running and in consideration of the complex environment where one or more different processes are concurrently using the programs being replaced.

The general problem is known and has been recognized in the prior art. A paper, "Change Programming in Distributed System", by G. Etzkorn, International Workshop on Configurable and Distributed Systems, pages 140-151, London, UK, Mar. 25-27, 1992, describes a method of dynamically reconfiguring programs in a system in which the programs communicate by message passing between ports. Reconfiguration occurs only when the system has reached a "reconfiguration state" and stays in such state while the changes are applied or made. The method requires a first series of reconfiguration commands that place the system in the reconfiguration state and then a series of change commands which effect the change. A change is made by reconfiguring an old version out of the system and configuring a new version into the system. The invention differs from such a system in several ways but the major points of distinction are as follows. First, the invention is not based on message passing but upon the use of entry points and safety points and the normal interaction of processes with the programs to be changed. Second, in the invention, both old and new programs may be executed concurrently via multitasking while the system described in the paper completely reconfigures an old program out of the way.

Another paper "Dynamic Program Modification in Telecommunication Systems", by O. Frieder et al., Proceedings of the IEEE SEVENTH CONFERENCE ON SOFTWARE ENGINEERING FOR TELECOMMUNICATION SWITCHING SYSTEMS, pages 168-172, 1989, proposes a solution for a subset of the problems in a distributed telecommunications environment. The updating process described in this paper replaces programs having plural procedures, one procedure at a time. "The updating system interrupts the program and examines the current state of its runtime stack. Based on this information and the list of all procedures that each procedure can call (generated by the language compiler), the updating system calculates when each procedure may be updated. Updating a procedure involves changing its binding from its current version to the new version. When all procedures have been replaced by their new version, the program update is complete." (pg. 169) A "procedure... that has changed between versions may be updated only when it is not active." In contrast, the invention updates active tasks and uses entry points and safety points, and does not examine any stack. The invention allows for concurrent execution of the old program and the new program by multiple tasks. Also, the invention does not require interception of every program exit.

The invention involves the use of "safety points" which are system observable events and conditions. These events and conditions control the routing of tasks to the old program or to the new program. One may relate the concept of a safety point in a program to a sync point in a database (DB) transaction. All DB changes must be permanently written in the data base once a sync point is reached, all of them should be backed out if the transaction aborts prior to reaching a sync point, and in some database managers, none of the changes are visible to other transactions until a sync point has been reached. The differences between the DB sync point and the program change safety points are:

Safety points are chosen anew with each change to the program. Sync points usually remain the same, even if the program flow or the database structure changes.

Safety points most often reside in modules which are not being changed, while sync points are often embedded in the program constituting the transaction.

Sync points are either explicit (system call), or trivially implicit (end of transaction implies a sync point). Safety points are explicit, but cannot be observed in the program. They must be specified externally to the program. It is not possible to code a system call saying "This task is now Safe for any change".

Safety points lose their meaning when the change is fully applied or the system is restarted with all new modules. Though the code in and around the safety point continues to execute, it bears no further significance as a safety point. The sync point is part of the ongoing logical significance of the program.

These differences also apply when comparing the concept of safety points and the concepts related to Checkpoint-Restart, and the points in time when the latter can be performed.

SUMMARY OF THE INVENTION

The problem of replacing program modules while a system is running has been an open issue for many years. There are numerous sub problems which make a solution difficult to implement. This invention describes a method that solves most known sub problems. The method is applicable to most commercial operating systems, including MVS/ESA and UNIX (TM AT&T) operating systems. The constraints within which the solution must operate, are:

1. The method should handle arbitrarily unstructured code, which may be called concurrently by multiple processes, using any method of call which is physically possible with the underlying machine architecture.

2. The running code (the old version which is being changed) should not have required or otherwise undergone a restructure, a rewrite or other modification in order to position it for the dynamic change at hand. An "ordinary" change should be applied to "ordinary" and existing code with the help of an external facility, and with the help of an administrative process.

3. Process blocking (quiescing) during implementation of a dynamic change must be kept to a minimum. Deadlocks are prohibited.

There are also many problems that need to be solved. Five problems are discussed next.

Problem 1: Coordinating Concurrent Changes to Multiple Modules— This is the most complex problem in managing dynamic changes. It revolves around the dependency of multiple processes on different versions of shared modules. For example, suppose two processes P1 and P2 call program A and program B occasionally. Changes to programs A and B involve loading two new, updated programs A' and B' into memory. It is possible that process P1 is at a point in which all new calls to A or B can be and should be routed to the new versions, namely, A' and B', while process P2 is at a point where it is still dependent on the old version of A and B, and invoking a new version will cause an error.

There are two common techniques to resolve this problem. One technique is to shut down the whole system before the change is implemented, and restart it after loading the new versions of the programs. The shutdown guarantees (in most cases) that both processes P1 and P2 are at a point where there is no outstanding dependence on programs A and B. Naturally, this solution suffers from the disadvantage that it causes a prolonged system outage which is often undesirable.

The second technique is to require that each process be contained within a "transaction", i.e., a short, independent work request. A transaction processing system is then replicated by hardware and software redundancy. Initially, all the transactions are processed by one copy of the transaction processing system (TPS) while the other copy is idle. The change is implemented on the idle copy of the TPS which in turns begins to process all newly arriving transactions. All new transactions unconditionally execute the new version of the program. Meanwhile, the original copy of the TPS continues to execute the old transactions (unconditionally calling only the old version of the program) until they are all completed, at which time it becomes idle and is then candidate for change. This solution does not commonly work in "legacy systems" which are not structured to process in this manner. The need for dynamic change exists nevertheless in those legacy systems and a solution which does not require a major restructure is desired. Also, this solution requires a considerable amount of redundancy which implies increased cost. This solution does not address the cases of long running processes (e.g. "batch jobs") which are never rerouted to the new system, and may not enjoy the benefits of dynamic change. Such long running processes also may delay indefinitely the time when the original system can be changed again. Also, many application program changes carry dependencies which survive beyond the life of a single transaction. Thus, new transactions are not all eligible for executing the new code and some may have to still execute the old code.

The invention solves this problem by performing conditional routing. Whenever a process invokes a program for which more than one version exists, the system routes the call to the version required by this process, based on the state of the given process.

Problem 2: Physical Replacement of Isolated Modules, i.e., replacing a single module independently of any other change and when no synchronization between multiple tasks is required— This problem is readily solved in an environment where all entries to the module are conveniently intercepted by the system. This situation exists when entry to the module is effected via some system call (LINK, ATTACH, FORK, EXEC, etc.) A straight forward solution is to route all calls which are directed at the module, and which were issued after the request for change was accepted by the system, to a new version of the module.

However, the problem is substantially more difficult if callers are allowed to call the module in ways which bypass all operating system services. In addition, forcing every program invocation to be constantly filtered by the operating system, lest there be a change pending, may consume substantial processor resources, and is considered prohibitive in a system in which there are frequently called functions such as those included in operating system kernels.

A second possible solution is to use the machine's ability to create interrupts based on program behavior such as program event recording (PER) in the ESA/390 system. This mechanism is limited in its ability to handle multiple concurrent outstanding changes, and imposes a substantial performance penalty on the system.

Another solution which has been suggested, is to modify the original program code in memory in a way that it will redirect the execution of the program to a new version loaded elsewhere in memory. Such interception needs to be specific to the module at hand and either cause a debugger to be invoked, or force unconditional execution of the new version of the code. This solution lacks the ability to coordinate between changes to multiple modules. In accordance with the inventive solution, a combination of comprehensive trapping with registration and filtering of safety points is used as described below.

Problem 3: Surgical Replacement of a Portion of a Module (e.g., a Control Sections (CSECT))— The problem here is to be able to replace a piece of the object code in a running program (usually a CSECT in a load module) while resolving all possible references to and from this code segment. As is well known a "CSECT" is an independent segment of a program and provides a scope of recognition of names. In an MVS environment, replacing a CSECT in the nucleus or kernel is a typical example of significant value. One may want to consider implementing even more local "patches" (part of a CSECT) with the proposed method. The solution is to treat each CSECT as a module being replaced in the manner of the invention, namely, the CSECT is compiled and linked independently as a separate program. Pointers in the old module which point to the old CSECT, are treated in the same way as pointers to a module.

Problem 4: Changing Data Structures— In problem 1, if the change to programs A and B involves a change to the layout or format of a data structure, the prior art does not offer any mechanism which enables the change to the program to be reflected in a pre-existing data structure. The solution provided herein does address this problem. If the data structure is private or local to the existing process, then by a proper choice of safety point, the data structure can be changed immediately upon reaching the safety point. A program which effects the change in the data structure, is not part of the update facility but is part of a change package which also includes change-instructions and updated programs. If the data structure is shared by multiple processes, the data structure can be changed when all of the processes which share the data structure, have been blocked at safety points. This technique is based on the manner in which coordinated groups are handled in accordance with the invention. Problem 5. Synchronizing Multiple Tasks— Problem 1 referred to dependencies within a single process. The problem is magnified if a certain set of processes P1,P2, . . . ,Pn, must all start calling the new versions A', B', together, at a synchronized point, while other processes Q1,Q2, . . . Qm, must still call the old versions of those programs indefinitely. This problem is solved by treating the processes as a coordinated group, as described below.

One of the objects of the invention is to provide an improved method for non-disruptively installing new versions of resident programs in a data processing system while the system is running.

A further object of the invention is to non-disruptively install new versions of operating system modules while the system is running and one or more processes are executing which use and access such modules.

Still another object of the invention is to provide a dynamic update facility that uses the combination of traps and safety points to effect transition between old and new versions of operating system programs.

Briefly, in accordance with the invention, when a new version of a module is installed, every invocation of the old version is intercepted by the system. A dynamic software update facility (DSUF), then determines the state of the process which invoked the program. If the process is "unsafe", the DSUF passes control to the old version of the program. If the process is "safe" the DSUF passes control to the new version of the program. When the change is first installed all processes are initially considered unsafe. The developer of the change, provides along with the new programs change-instructions including a set of conditions under which a process can undergo a state transition from unsafe to safe. The DSUF, upon its initialization sets itself up to capture all process transitions from an unsafe state to a safe state. Thus the DSUF has complete knowledge about the state of each process and can exercise the conditional routing of control according to the developers specifications. The conditions for state transition are called "safety points".

DRAWINGS

Other objects and advantages of the invention will be apparent from the following description taken in connection with the accompanying drawings wherein.

DETAILED DESCRIPTION

Figure 1:
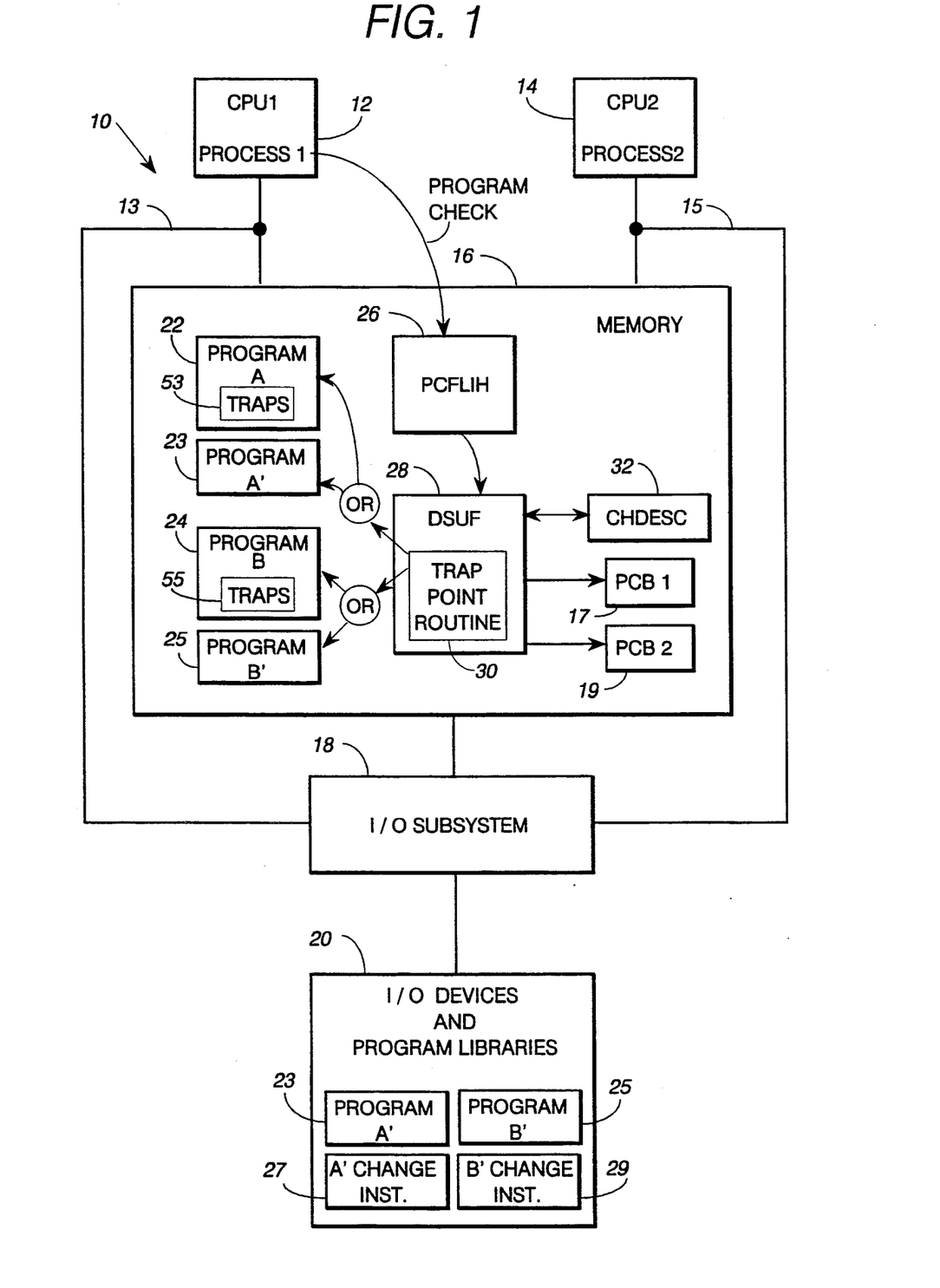
FIG. 1 is a block diagram of a data processing system embodying the invention.

Referring now to the drawings, and first to FIG. 1, a data processing system (DPS) 10 comprises a plurality of central processing units (CPUs) 12 and 14 (also referred to as CPU1 and CPU2) connected to a common memory 16 and to an I/O subsystem 18 by busses 13 and 15. I/O subsystem 18 is further connected to various I/O devices and program libraries 20. DPS 10 is preferably a large, commercially available IBM ESA/390 computing system that runs under IBM MVS/ESA operating system and is classed as a multitasking, multiprocessing DPS. FIG. 1 schematically illustrates memory 16 as it appears when the system is operating in the RUN phase described hereinafter. For the purpose of illustrating the invention, assume that memory 16 stores two modules 22 and 24 that contain two old programs A and B respectively, which programs are part of the operating system and are shared by various other programs and processes being executed in either or both of CPU1 and CPU2. The general problem which the invention addresses and solves is how to replace modules 22 and 24 with updated modules 23 and 25 respectively containing new program A' and new program B', while the system is running subject to the constraints and sub-problems stated previously. The new programs A' and B' are changed or updated versions of old programs A and B. Each module may have more than one entry point.

The general operation of DPS 10 will now be described with reference to both FIGS. 1 and 2. Prior to execution of PROCESS1 and PROCESS2, standard process control blocks (PCBs) 17 and 19 are created by the operating system in memory 16 which blocks contain information about the processes. Such blocks or extensions thereto are modified in accordance with the invention to include a selectively settable marker or flag, or bit for each change indicating whether the corresponding process is safe or unsafe to use the updated program(s) being provided with such change. Also, information about the state of the conditions which make a process eligible to be marked safe, are stored in the PCB or an extension thereto. These conditions comprise the events and/or states when the process is deemed "safe". A dynamic software update facility (DSUF) 28 is loaded into memory 16 at system initial program load (IPL) and is selectively activated thereafter to dynamically update installed operating system programs A and B.

Prior to activation of the DSUF, the new programs are created by a change programmer modifying the old programs, recompiling, and linking the new programs to form load modules 23 and 25. Such modules are with machine readable change-instructions 27 and 29, for dynamically installing the new modules and programs. The change-instructions identify all entry points in the old programs and all safety points wherever located, such safety points being the events or conditions which make a process eligible for executing the new code. If the change involves a change in a data structure, a program called data structure change effector (DSCE) is also packaged to make the change in the data structure. The exemplary change does not include a data change and thus no DSCE is shown in the drawings.

It is believed that a detailed discussion of "safety points", at this place in the description, will facilitate a better understanding of the invention. When a change programmer is developing a change to a system, the programmer can analyze the change modules to determine the dependencies of tasks or processes on execution of the old version and of the new version. During such analysis, the programmer can determine the conditions which must be satisfied when processes can stop executing the old program and start executing the new program. Often, conditions can be translated into events in the life of a task, or the combination of an event with an observable state of the process. These events, states, and associated conditions are deemed to be "safety points". A safety point is specified by the change programmer designing a change. Examples of safety points are when a task is: started after the change was implemented (that is, all new tasks are "safe"), entering or exiting a particular module (either one of the changed modules or another unchanged module), making a particular system call, executing an instruction at a given offset at a given module, observed as swapped out, observed as being in a problem or user state (as opposed to a supervisor state), observed as being in a wait state awaiting completion of some other task or awaiting some new work to be assigned to it, running under a given job name, and not running under a given job name.

These events and conditions are either observed by the system since they include a system call, or observed by the DSUF which receives control and tests for safety conditions before marking a process as safe. Subsequently, any task attempting to execute the old code will be routed either to the old code if the process is unsafe or to the new code if the process is safe. The change-instructions specify the conditions which allow the DSUF to determine which version of the program can be used by the process. Safety points can be in the old program, in the process itself, or in some other program, task or process. The safety points also include code, referred to hereinafter as "safety point code" that is executed at or near the safety point. Such code includes a safety point trap, a "wait" instruction that places the process in a wait state, etc.

Figure 2A:
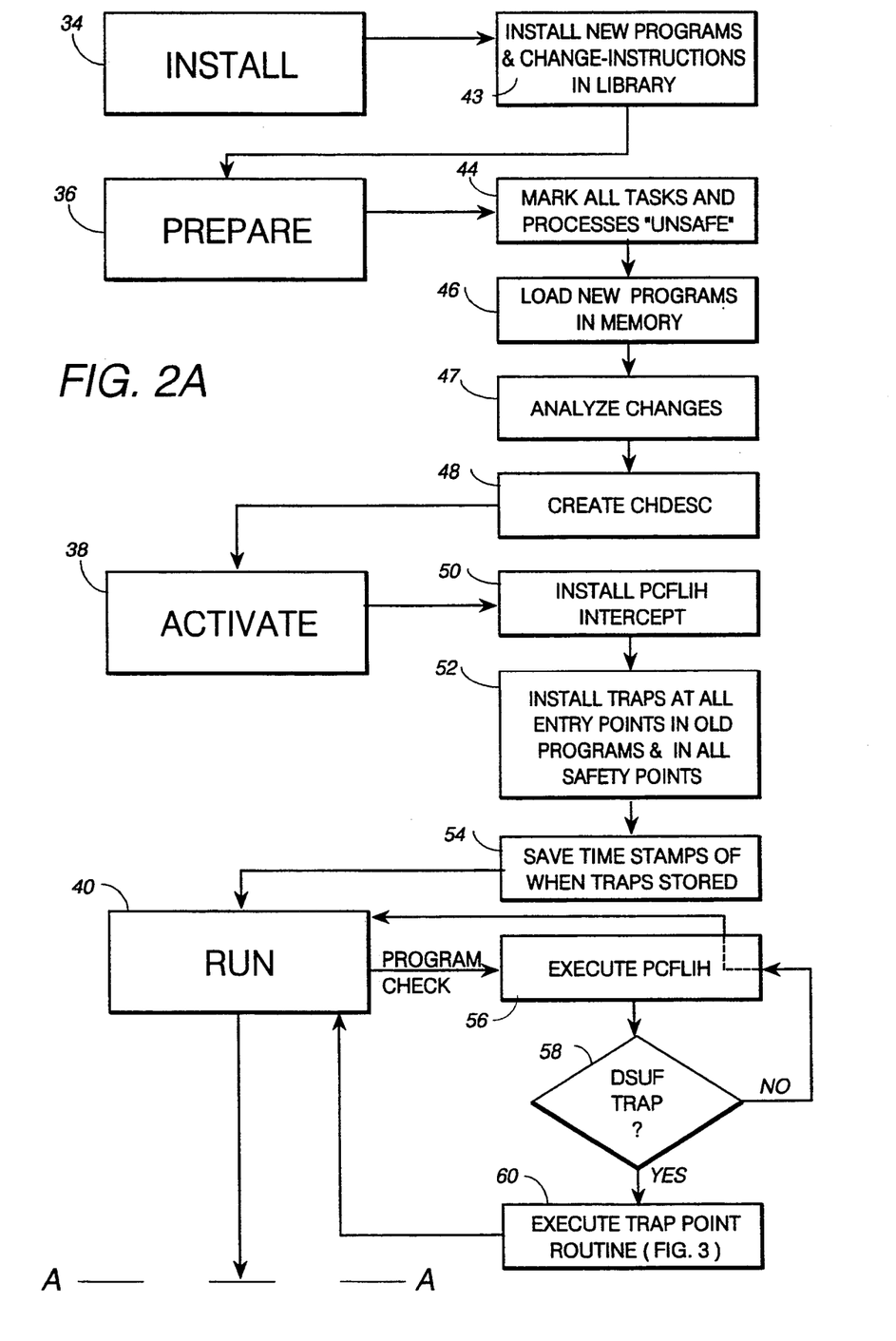
FIGS. 2A and 2B, when joined at reference line A—A form a block diagram illustrating the general operation of the invention.
Figures 2B, 3:
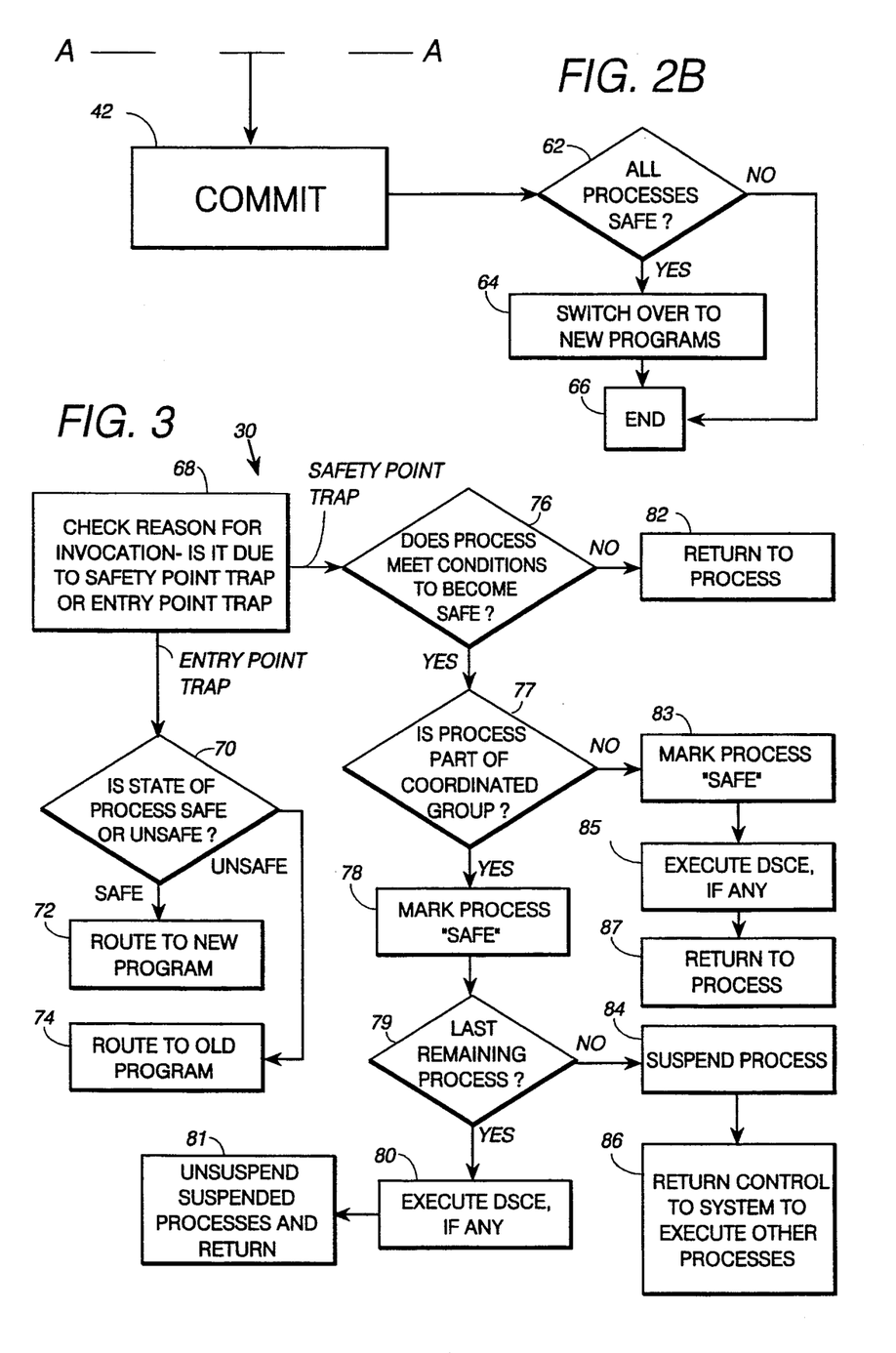
FIG. 3 is a flow chart of a trap point routine shown in FIG. 1.

DSUF 28 operates in phases, the different phases being shown in FIG. 2 as labeled boxes located along the left side of FIG. 2. Different more detailed actions which occur during such phases, are shown as labeled boxes located along the right side of FIG. 2. The different phases include an INSTALL phase 34, a PREPARE phase 36, an ACTIVATE phase 38, a RUN phase 40, and a COMMIT phase 42.

When DSUF 28 is activated, INSTALL phase 34 performs step 43 to store load modules 23 and 25 and change-instructions 27 and 29, in program library 20. Next, during PREPARE phase 36, step 44 initially marks all processes and tasks as "unsafe". Such marking is done by setting the safety status in the corresponding PCBs 17 and 19. Step 46 then loads copies of the new programs A' and B' from the library into memory 16 in such a manner that the new programs are initially "hidden" from the rest of the system. That is, no pointer is created allowing direct access to either program by the rest of the system—only DSUF has direct access initially. Step 47 analyzes the changes by reading the change-instructions 27 and 29 and step 48 then creates a change descriptor (CHDESC) table 32, in memory 16, for storing the change information including the specific conditions and events which make each task eligible to be "safe". Table 32 is described below relative to FIG. 4 and contains information for controlling the update process.

During ACTIVATE phase 38, step 50 enables an intercept in a standard program check first level interrupt handler (PCFLIH) 26 so that from this point on, DSUF 28 receives control on every program check interrupt. Step 52 installs traps 53 and 55 in memory 16 at all entry points in the old programs and at all safety points in old programs A and B and elsewhere as predetermined by the change programmer and set forth in the change-instructions. Each trap is a hex byte x00 in the first byte and may include a second byte that is an access index into the hash table in CHDESC 32, described below. Alternatively, a trap can comprise a machine instruction which either causes an interrupt or otherwise enables the invocation of the DSUF. Step 54 then saves time stamps of when the traps were stored. The system is thus initialized and prepared for the run phase during which various processes are executed or run in CPUs 12 and 14.

During RUN phase 40, the system appears as shown in FIG. 1. When a process being executed by one of the CPUs, e.g. PROCESS1, enters program A, an attempt is made to execute the first trap byte x00. Such code is an invalid instruction and the attempt to execute it produces a program check interrupt causing PCFLIH 26 to be executed in step 56. DSUF 28 receives control from PCFLIH, examines the cause of the interrupt, and determines in step 58 whether the trap is a DSUF trap. When an interrupt occurs, information is passed indicating the source of the interrupt and the determination of step 58 looks at such source. If the trap is not a DSUF trap, control is returned to PCFLIH to continue execution. If step 58 produces a positive or 'YES' result, then trap point routine 30 is executed in step 60 to determine from the safety status recorded in the associated PCB whether program A or program A' should be executed, and to route or pass control to the appropriate new or old program for execution.

At a later time, a user can request the change to be committed and thereby initiate COMMIT phase 42. Alternatively, the COMMIT phase can be initiated automatically, e.g. by lapse of a predetermined amount of time sufficient in duration to reasonably insure that the new programs will work properly. In COMMIT phase 42, step 62 determines if all the processes are safe, i.e., have all the processes been marked "safe". If so, step 64 switches over to the new programs and step 66 ends the COMMIT phase. If any process is not safe, step 62 bypasses step 64 and the new programs are not committed. The switching over to the new programs is done by locating in each entry point node in CHDESC 32 the arrays of addresses that point to the old code and then storing in such addresses pointers to the new code. Any task still using a "saved" old address executes correctly since the trap remains in place and routine 30 routes all callers of the old code to the new code. The changes can be backed out of by a similar process of applying an ordinary change where old and new versions exchange their roles. The advantage over plain removal of the trap is that safety rules can (optionally) be applied. For example, if a process is already executing the new code, it can keep doing so but all subsequent new processes would go back to the old code.

Referring to FIG. 3, when trap point routine 30 is executed, step 68 checks the reason for invocation, i.e., whether the reason is because of an entry point trap or a safety point trap. The tripping of a safety point trap indicates a state transition from unsafe to safe has occurred. If the reason is an entry point trap, step 70 looks at a safety status marker in the PCB of the process that tripped the trap, and decides if the state of the process is safe or unsafe. Step 72 then routes a safe process to the corresponding new program. If the process is unsafe, step 74 routes the process to the old program. Such routing is schematically shown in FIG. 1 by the OR functions between routine 30 and the programs A or A' and B or B'. When a trap is written or loaded into an entry point, the instruction that was previously there is overwritten. Since there is a need to be able to produce the results of the old code including results of the instruction that was destroyed, the problem can be overcome in at least three different ways. First, the instruction before it is overwritten, is copied into step 74 and is executed immediately before a branch instruction which branches to the instruction in the old program immediately following the instruction that was destroyed. Second, since many entry points merely contain branch instructions for bypassing definitional information in the old program, a branch instruction can be placed in the step 74 to branch to the target instruction in the old program. Third, a fresh copy of the old program, called fresh old or FROLD, can be stored before the traps are loaded, and the fresh copy executed, instead of the old program.

If a state transition event or safety point trap invoked routine 30, step 76 decides if the process that tripped the trap meets the conditions to become safe. If the process does met such conditions, step 77 decides if the process is part of a coordinated group. A coordinated group might be a parent process and subordinate "child" processes, and indications thereof are placed in the associated PCBs. If the process is not part of such a group, step 83 then marks the process as "safe" in the corresponding PCB. Step 85 then executes the DSCE if one exists, and step 87 then returns to the process. On the other hand, if the process is part of a coordinated group, step 78 marks the process "safe". Step 79 checks to see if the process is the last process remaining in the group. If it is, step 80 executes and DSCE, and step 81 then unblocks or unsuspends all of the suspended processes and returns to the system. If step 79 results in a negative determination, step 84 suspends the process and step 86 returns control to the system to execute other processes.

It should be apparent that because each process is initially marked unsafe, until such time that the process is marked safe, whenever the process attempts to enter the old program, an interrupt is generated which causes the process to be routed to the old program. When such process subsequently hits a safety point trap, the process is then marked safe and subsequent attempts to enter the old program direct the process to the new program. The method prevents any disruption to processes that may be executing the old programs at the time of the change. A very simple example of an update is one where a process or task that starts after the new program has been installed must execute the new programs while processes started before such point in time execute the old code. In such example, the entry point of the new program is defined as the safety point and the time stamp of when a trap is installed in step 54 can be compared to the time when a process starts, to determine if such process is safe or unsafe.

Figure 4:
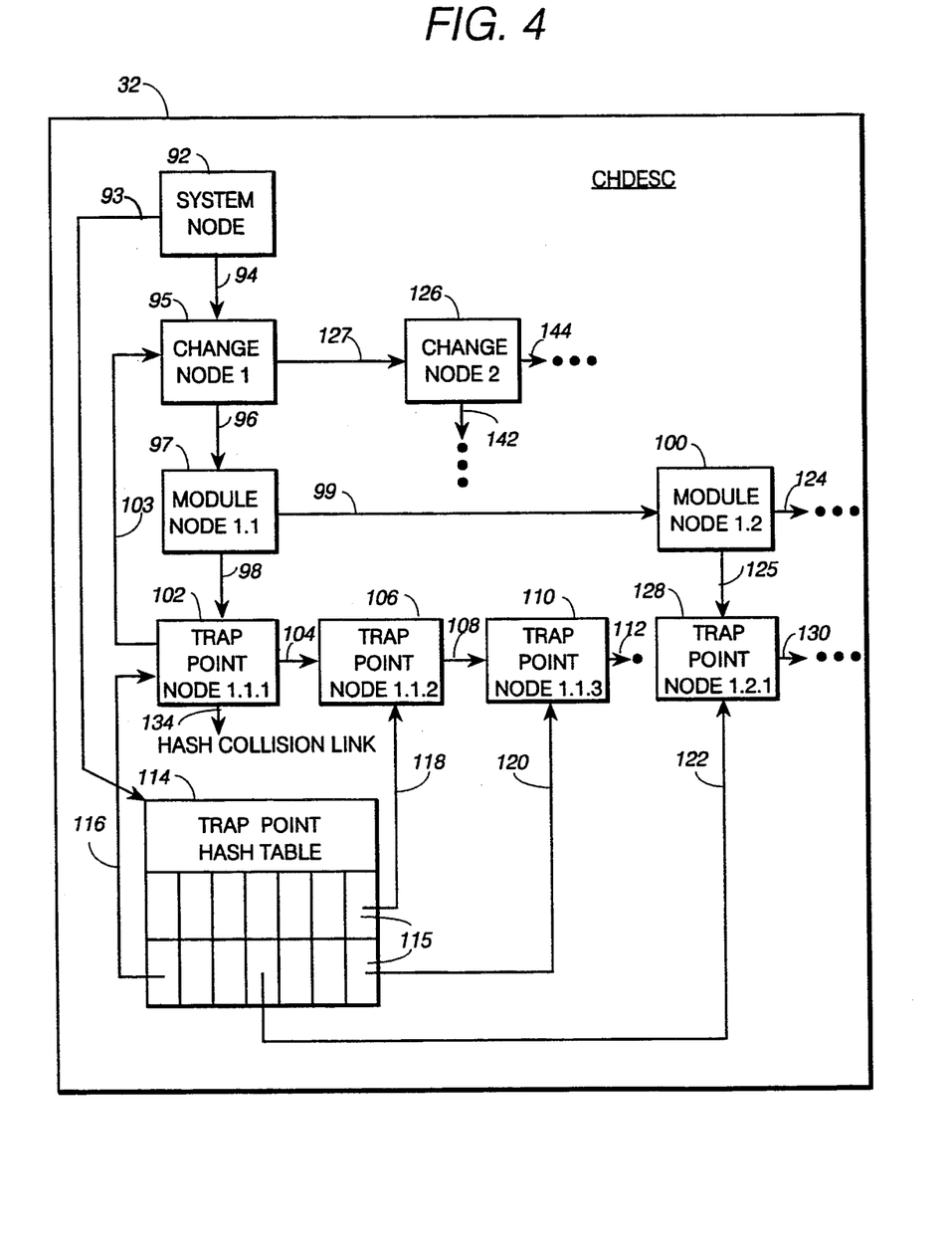
FIG. 4 is a schematic diagram illustrating the tree structure of the change descriptor table shown in FIG. 1.

As shown in FIG. 4, CHDESC table 32 comprises a system node 92 having a pointer 93 to a trap point hash table 114 and a pointer 94 to a change node 95. The address of system node 92 is stored in memory and made known to trap processing routine 30, as is the base address of hash table 114. Node 92 is the root of a nodal tree data structure having a plurality of nodes and pointers. If there is no node for a pointer to point to, a null value is set in the pointer field. There is one change node for each change. Change node 95 contains a pointer 96 to a dependent module node 97 and a pointer 127 to a sibling change node 126. There is one module node for each module in a change. For example, if two modules 22 and 24 are being both revised with a single change, there would be a module node for each. Module node 97 has a pointer 98 to a dependent trap point node 102 and a pointer 99 to a sibling module node 100. There is one trap point node for each trap point in a change. Further trap point nodes 106, 110 are siblings of node 102 and are pointed to by pointers 104, 108. Additional sibling trap point nodes are pointed to by pointer 112. Module node 100 contains a pointer 124 to any further sibling module nodes and a pointer 125 to the head trap point node 128 of a chain of further trap point nodes pointed to by pointer 130. Change node 126 contains a pointer 142 to dependent module nodes (not shown) and a second 144 to further sibling change nodes (not shown)

Hash table 114 contains a plurality of fields 115, there being one field 115 for each trap point in the old programs. Each field contains a pointer to a different, single trap point node. Trap point nodes 102, 106, 110, and 128 are respectively pointed to by pointers 114, 118, 120, and 122. As previously indicated, the first byte of a trap contains x00 and the second byte contains an access index into table 114 for the particular trap. Each trap point node is thus accessible through two paths. One path follows pointer 93 from system node 92 to table 114 and uses the access index in the second byte of a trap to get to a particular field that contains a pointer to the particular trap point node. The second path follows pointer 94 from system node 92 and additional pointers from change node 95 to get to a particular trap point node. For example, trap point node 110 is accessible by pointers 96, 98, 104, and 108. Since the access index is one byte, only 256 entries can be made directly in table 114. To provide for a larger number of trap points, the indices are assigned on a first come, first served basis but with wraparound so that there could be plural traps associated with each table entry. To accommodate this, a collision chain may be provided for the additional entries which chain is accessed through a hash collision link 134. The chain links those trap nodes associated with the same hash table entries.

The various nodes store information not all of which is required or used by the invention. Each change node, in addition to the two pointers previously described, stores the safety point type for this change, a time stamp of completion of the ACTIVATE phase for this change, and flags signifying:

PREPARE completed: yes/no
ACTIVATE started: yes/no
ACTIVATE completed: yes/no
COMMIT completed: yes/no
Change is ordinary forward change, or it is a backout of another change.
Change was backed out by another change.

Each module node further contains module name, address where module is stored in memory, total sizes of FROLD if one is provided and of new module, pointer to same module node in a previous change which is overridden by this change, and flags indicating whether the areas occupied by the FROLD and new versions for this change, have already been freed.

Each trap point node further contains address of where trap is located, expected program status word (PSW) at time of trap, FROLD address, new version address, address of entry point node for this entry point in the next active change that overrides this change (if this is a 0, then it is still possible that there is a prepared change ready to override. This field is stored only during the ACTIVATE phase of the next trap point node), address of trap point node of this trap point in a previous active change, the one that is or will be overridden by this change or 0 (this field is stored during the PREPARE phase of this node), address of trap point routine 30 for this entry point, addresses of parent change and module nodes for this module/change instance, array of all addresses that need to be fixed during COMMIT, indicators indicating if the new code was used at least once and the old code was used at least once, hash table index for this node, instruction to be executed to set a call register correctly, work areas to be used for storing information overridden during ACTIVATE, and an indicator whether above addresses are real or virtual.

When a safety point trap is tripped, step 76 determines if the task or process meets the conditions of eligibility for becoming safe. This step is accomplished by going to the source of the interrupt, namely the safety point trap code, and obtaining the hash table index for such trap. Using the index along with the base address of the hash table, step 76 then accesses the corresponding trap entry node and obtains therefrom the pointer to the corresponding change node, which contains information on what conditions establish the safety point. Steps 76 then accesses the PCB for the process that tripped the trap and determines from such conditions whether the task is eligible to be safe.

It should be apparent to those skilled in the art that many changes can be made in the details and arrangements of steps and parts without departing from the scope of the invention as defined in the appended claims.

What is claimed is:

1. The method of dynamically updating an old operating system program (hereinafter "old program") stored in a main memory of a data processing system (DPS) while said DPS is running and executing at least one task that accesses said old program from time to time in a multitasking mode, said method comprising:
    (A) storing in said memory a new program that is an updated version of said old program;
    (B) establishing an executable safety point in said DPS which produces a machine observable safety point condition;
    (C) storing in said memory a selectively settable first marker for indicating whether said one task is safe or unsafe for executing said new program, said first marker being initially set to indicate said one task is unsafe;
    (D) executing said one task and entering said old program through an entry point therein;
    (E) in response to entering said entry point, examining said first marker and in response to noting said one task is unsafe, passing control to said old program for execution thereof:
    (F) executing said safety point to produce said safety point condition;
    (G) in response to observing said safety point condition, setting said first marker to safe;
    and (H) after said marker has been set to safe, executing said new program each time said first task enters said old program.

2. The method in accordance with claim 1 comprising:
    (I) installing an entry point trap in said old program at said entry point before performing step (D);
    step (D) comprises tripping said entry point trap;
    and step (E) is performed in response to tripping said entry point trap.

3. The method in accordance with claim 2 wherein said entry point trap is effective when tripped to generate a first interrupt, and said method further comprises
    (J) installing an interrupt handler in said DPS for intercepting said first interrupt and branching to step (E).

4. The method in accordance with claim 3 wherein:
    said safety point comprises a safety point trap which when executed in step (F) generates an interrupt of the same type as said first interrupt generated by said entry point trap;
    and step (J) further comprises intercepting said second interrupt and branching to step (G).

5. The method in accordance with claim 4 wherein said step (E) is done by first deciding that said first interrupt is generated by said entry point trap, before examining said marker and passing control;
    and step (G) is done by first deciding said second interrupt is generated by said safety point trap, before setting said marker to safe.

6. The method in accordance with claim 3 wherein said entry point trap comprises an invalid op code effective when executed to generate a program check interrupt, and said interrupt handler comprises a program check first level interrupt handler having an intercept for said program check interrupt.

7. The method in accordance with claim 1 wherein a second task is being executed which also attempts to access said old program, and said method further comprises:
    storing in said memory a second marker which is selectively settable to alternatively indicate the status of said second task is safe or unsafe for executing said new program, said second marker being initially set to indicate said second task is unsafe;
    and thereafter performing for said second task steps similar to steps (D) through (H) whereby both said second task thereafter causes said new program to be executed.

8. The method in accordance with claim 7 wherein said first task and said second task form a coordinated group wherein said first task is suspended when said first marker is set to safe, until said second marker is set to safe whereupon said first task is unsuspended.

9. The method in accordance with claim 1 wherein said one task comprises executable code and a control block stored in said memory for storing information controlling operation of said one task, said first marker being located in said control block.

10. The method in accordance with claim 1 wherein said safety point comprises a safety point trap which is executed in step (F).

11. The method of dynamically updating an old operating system program (hereinafter "old program") stored in a main memory of a data processing system (DPS) while said DPS is running and executing at least one task that accesses said old program from time to time, said method comprising:

(A) installing in said DPS a selectively activated dynamic software update facility (DSUF) having a trap processing routine;

(B) storing in said memory prior to activation of said DSUF a new program and a status marker for said one task, said new program being an updated version of said old program, each status marker being selectively settable to indicate that said one task is safe or unsafe to execute said new program, said status marker being initially set to unsafe;

(C) activating said DSUF by (C1) storing an entry point trap at each entry point into said old program, each entry point trap generating an entry point interrupt when such each trap is tripped, (C2) establishing a safety point in said DPS which safety point includes safety point code effective when executed to signify said one task is eligible to be marked safe and execute said new program, and (C3) installing in said DPS an interrupt handler for intercepting said entry point interrupt and executing said trap processing routine;

(D), after activation of said DSUF, running said DPS to execute said one task and, in response to said one task entering said old program, performing steps comprising (D1) tripping said entry point trap to generate said entry point interrupt, and (D2) executing said trap processing routine in response to said entry point interrupt from step (D1) to examine said status marker and in response to noting said status is unsafe, branching to said old program for execution thereof;

(E) further operating said system until said safety point code is executed and, in response thereto, setting said status marker safe;

and (F) thereafter executing said new program each time said one task enters said old program and trips one of said entry point traps.

12. The method in accordance with claim 11 wherein: said safety point code is a trap operative when tripped to generate a safety point interrupt;

and step (E) comprises executing said trap to generate said safety point interrupt and branching to said trap processing routine, said trap processing routine being operative to set said status marker safe.

13. The method of claim 12 wherein said safety point trap and said entry point trap generate the same type of interrupt, and said trap processing routine performs the steps comprising:

examining the source of each interrupt and deciding whether such interrupt is a safety point interrupt or an entry point interrupt, and branching to a routing routine when said interrupt is an entry point interrupt and to a safety point processing routine when said interrupt is a safety point interrupt;

and executing said routing routine to branch to said old program when said task is unsafe and to said new program when said task is safe.

14. The method in accordance with claim 13 comprising:

executing said safety point processing routine to decide if said task meets predetermined conditions for such task to become safe, and to set said status marker to safe when said task meets said predetermined conditions.

15. The method in accordance with claim 14 wherein a safety point is selected from a group of conditions comprising:

when a task is started, upon a task entering a particular module, upon a task exiting a particular module, when a task makes a particular system call, if a task executes an instruction at a given offset at a given module, when a task is swapped out, when a task is observed as being in a problem state, when a task is observed as being in a wait state awaiting completion of some other task, when a task is awaiting new work to be assigned to it, when a task is running under a given job name, and when a task is running other than under a given job name.

16. The method in accordance with claim 11 wherein said system includes at least one additional task which accesses said old program, said DPS operating in a multitasking mode, and said method further comprises;

storing in said memory a second status marker for said additional task, said second status marker being selectively settable to indicate that said additional task is safe or unsafe to execute said new program, said second status marker being initially set or unsafe;

establishing a second safety point in said DPS which includes second safety point code effective when executed to signify said additional task is safe to execute said new program;

and thereafter performing in steps (D) through (F) in such a manner as to performs steps for said additional task similar to those performed for said one task whereby said additional task executes said new program each time it enters said old programs and trips an entry point trap therein.

17. The method in accordance with claim 16 wherein said one task and said additional task are coordinated, and said method comprises:

suspending execution of said one task after it becomes safe, until said second safety point is executed and said additional task becomes safe;

setting said second status marker to safe;

and then unsuspending said one task whereby each task can then execute said new program.

18. The method in accordance with claim 17 wherein said DPS is a multiprocessing system comprising a plurality of processors for executing said tasks, said memory and programs stored therein being shared by tasks executing in said processors.

19. The method in accordance with claim 16 wherein said memory further stores a data structure which is accessed by one or more of said tasks, and said method further comprises:

storing in said memory a data structure change effector program for changing data in said data structure;

and, in response to said one or more tasks being marked safe, executing said data structure change effector program to change the data in said data structure.

* * * * *